(12) United States Patent
Todd

(10) Patent No.: US 8,498,934 B2
(45) Date of Patent: Jul. 30, 2013

(54) MULTI-ACCOUNT PAYMENT CONSOLIDATION SYSTEM

(75) Inventor: Eric Todd, Old Tappan, NJ (US)

(73) Assignee: BML Productions, Inc., Secaucus, NJ (US)

( * ) Notice: Subject to any disclaimer, the term of this patent is extended or adjusted under 35 U.S.C. 154(b) by 26 days.

(21) Appl. No.: 12/909,710

(22) Filed: Oct. 21, 2010

(65) Prior Publication Data

US 2012/0101882 A1 Apr. 26, 2012

(51) Int. Cl.
*G06Q 40/00* (2012.01)
*G06Q 20/04* (2012.01)
*G06Q 20/02* (2012.01)
*G06Q 40/02* (2012.01)
*G06Q 30/06* (2012.01)

(52) U.S. Cl.
CPC .............. *G06Q 20/04* (2013.01); *G06Q 20/02* (2013.01); *G06Q 40/02* (2013.01); *G06Q 30/06* (2013.01)
USPC ............. 705/39; 705/35; 705/43; 705/30; 705/14.17; 705/64; 709/205; 235/379

(58) Field of Classification Search
USPC ......... 705/39, 35, 43, 30, 14.17, 64; 235/379; 709/205
See application file for complete search history.

(56) References Cited

U.S. PATENT DOCUMENTS

| | | | |
|---|---|---|---|
| 7,587,363 B2 | 9/2009 | Cataline et al. | |
| 7,606,730 B2 | 10/2009 | Antonucci | |
| 7,606,766 B2 | 10/2009 | Anderson et al. | |
| 7,627,531 B2 | 12/2009 | Breck et al. | |
| 7,630,937 B1 * | 12/2009 | Mo et al. | 705/39 |
| 7,647,252 B2 | 1/2010 | Rampell et al. | |
| 7,653,597 B1 | 1/2010 | Stevanovski et al. | |
| 7,668,782 B1 | 2/2010 | Reistad et al. | |
| 7,676,434 B2 | 3/2010 | Evans | |
| 7,766,244 B1 * | 8/2010 | Field et al. | 235/493 |
| 2003/0097331 A1 * | 5/2003 | Cohen | 705/39 |
| 2004/0019568 A1 * | 1/2004 | Moenickheim et al. | 705/64 |
| 2009/0144163 A1 * | 6/2009 | Dickelman | 705/17 |
| 2009/0265249 A1 | 10/2009 | Bishop et al. | |

OTHER PUBLICATIONS

National Bank's All-In-One: The Innovative Financial Management Tool that Just Got Better; Business Wire, p NA; Feb. 15, 2006.*
Multimedia kiosks in retailing; Rowley, Jennifer; International Journal of Retail & Distribution Management v23n5 pp. 32-40, 1995.*

* cited by examiner

*Primary Examiner* — Tien Nguyen
(74) *Attorney, Agent, or Firm* — Weitzman Law Offices, LLC

(57) ABSTRACT

A multi-account payment consolidation system and process, comprising a payment terminal at a point-of-sale. A central computer system is operatively coupled to the payment terminal through a network connection, the central computer system including at least a processor, and memory comprising program instructions. The program instructions are executable by the processor to register a plurality of external financial accounts and associate them with a user, register at least one customized rule-set for processing a payment associated with the user, authenticate the user when the user logs in at the payment terminal, automatically process the payment in accordance with the customized rule-set by accessing the external financial accounts, and receive a payment confirmation from the external financial accounts for display to the user on the payment terminal.

54 Claims, 4 Drawing Sheets

MULTI-ACCOUNT PAYMENT CONSOLIDATION SYSTEM

BACKGROUND

1. Field

This disclosure relates generally to payment systems and, more particularly, to a specialized multi-account payment consolidation system and process that allows a user to seamlessly draw funds from any number of external financial accounts to perfect payment at a point-of-sale.

2. Background

Consumers utilize a range of instruments for conducting daily retail transactions, including cash, personal check, any number of credit cards and a bank debit card. However, under the current infrastructure, consumers cannot utilize the full range of payment options available to them at a point-of-sale. Consumers are instead forced to use one payment method to satisfy a transaction at a point-of-sale. For example, a consumer at a retail register typically has the choice to pay by check, credit card, debit card or cash. If the consumer chooses to utilize two payment methods simultaneously (e.g., splitting a bill by paying partly with cash and partly with credit card), that choice invariably complicates the transaction, requiring the cashier to perform additional steps at a register to enable a multi-account payment. As a result, utilizing multiple accounts to enact payment at a point-of-sale is generally discouraged, because it is inconvenient for the consumer, the retailer and other consumers waiting at the register.

Consumers suffer many disadvantages as a result of this deficiency. For example, both credit cards and debit cards routinely charge large penalty fees for charging past the credit limit or over-drafting. Most consumers are not fully aware of these costs and penalties, and the impact they can have on the consumers' cost of credit. These penalties could easily be avoided if consumers had the ability to seamlessly utilize the full range of payment options available to them at a point-of-sale. For example, it is less common for a consumer to be near the limit of his credit card balance for all of his/her credit cards. And yet, momentary inattention to the balance of a single card may cause the consumer to suffer a large penalty fee for overcharging a single card, even as he/she possesses other credit cards with available credit. In the worst case, the card may even be declined, causing a fair amount of distress, not to mention public embarrassment as a result of delaying the checkout process for him/herself and other customers on line, temporarily removing oneself from the checkout queue, reducing the number of items being purchased, or simply walking away from the transaction altogether. Furthermore, if a consumer is near his balance limit for the majority of his accounts, it may be impossible for the consumer to pay a bill with any single account. The consumer would have the ability to perfect payment if he could combine the available balances from multiple payment sources (such as, for example, cash reserves, debit accounts, credit accounts, etc.) into a single payment. Unfortunately, the current infrastructure simply fails to easily support this kind of transaction.

Furthermore, many retailers accept only a certain type of credit card, limiting the accounts with which a consumer may pay. Retailers are also burdened with negotiating arrangements with different credit card companies, often paying higher premiums for some cards, or simply refusing them altogether. These factors work to the detriment of both the consumer and retailer. The consumer is forced to select one of the retailer-approved cards for use, limiting the utility of possessing multiple credit cards, and ironically forcing the consumer to have at least a few different credit cards to begin with, if he wishes to shop at more than a handful of retailers. Retailers are forced to impose these artificial limitations on accepted payment methods because of the difficulty of procuring payment arrangements with all possible credit card providers. Oftentimes, the non-accepted credit cards (especially store-specific cards) have significantly advantageous secondary benefits, such as a high cash-back incentive. The inability to use the non-accepted credit card universally seriously frustrates the usefulness of possessing that card in the first place.

Security is another issue with the current system. Credit card security is typically predicated only on possession of the card and a signature matching the signature on the back of the card. This security system is poor, as signatures are easily forged, and retail cashiers rarely examine signatures during payment. Card numbers are also vulnerable to a large number of fraud and identity theft scams. Exposing the card number to a large number of retailers and human handlers (such as cashiers) merely increases the chances of victimization both in person and online.

Thus, there is a need for a multi-account payment consolidation system and process that gives a consumer the ability to seamlessly draw from multiple unrelated financial accounts to maximize the utility of the payment methods available to him, while simultaneously masking financial difficulties and providing enhanced levels of security against account fraud and identity theft.

BRIEF SUMMARY

In one aspect of this disclosure, a multi-account payment consolidation system and process is disclosed. The multi-account payment consolidation system and process comprises a payment terminal at a point-of-sale (both in person or over networks, such as the Internet or a telephone network), and a central computer system that is operatively coupled to the payment terminal through a network connection. The central computer system includes at least a processor, and memory comprising program instructions. The program instructions are executable by the processor to register a plurality of external financial accounts and associate them with a user, register at least one customized rule-set for processing a payment associated with the user, authenticate the user when the user logs in at the payment terminal, automatically process the payment in accordance with the customized rule-set by accessing the external financial accounts, and receive a payment confirmation from the external financial accounts for display to the user on the payment terminal.

The foregoing has outlined rather generally the features and technical advantages of one or more embodiments of this disclosure in order that the following detailed description may be better understood. Additional features and advantages of this disclosure will be described hereinafter, which may form the subject of the claims of this application.

BRIEF DESCRIPTION OF THE DRAWINGS

This disclosure is further described in the detailed description that follows, with reference to the drawings, in which.

DETAILED DESCRIPTION

This application discloses a multi-account payment consolidation system and process that seamlessly enables a consumer to pay at a real or virtual point-of-sale using a customized payment scheme that draws funds from one or more external financial accounts. Consumers are, therefore, afforded a larger degree of utility from their financial accounts, as they are no longer limited to utilizing a single account per transaction. Additionally, consumers gain enhanced protection against overcharge fees, overdraft fees and other costly penalties because the multi-account payment consolidation system and process may be set to automatically draw accounts down to their limit without exceeding that limit. Furthermore, consumers may be offered access to live account balances not available under current payment systems. The multi-account payment consolidation system and process also safeguards consumers against embarrassment and distress caused by having a financial account rejected at a point-of-sale (due to lack of funds, for example), because the system and process may access multiple accounts to fulfill the balance of a transaction. Furthermore, consumers gain protection against identity theft and other types of fraud, because the multi-account payment consolidation system and process may utilize much more stringent forms of security compared to, or example, the signature/possession-based or pin-number based security of credit and debit cards, and further reduces the frequency of exposure of sensitive card information.

Figure 1:
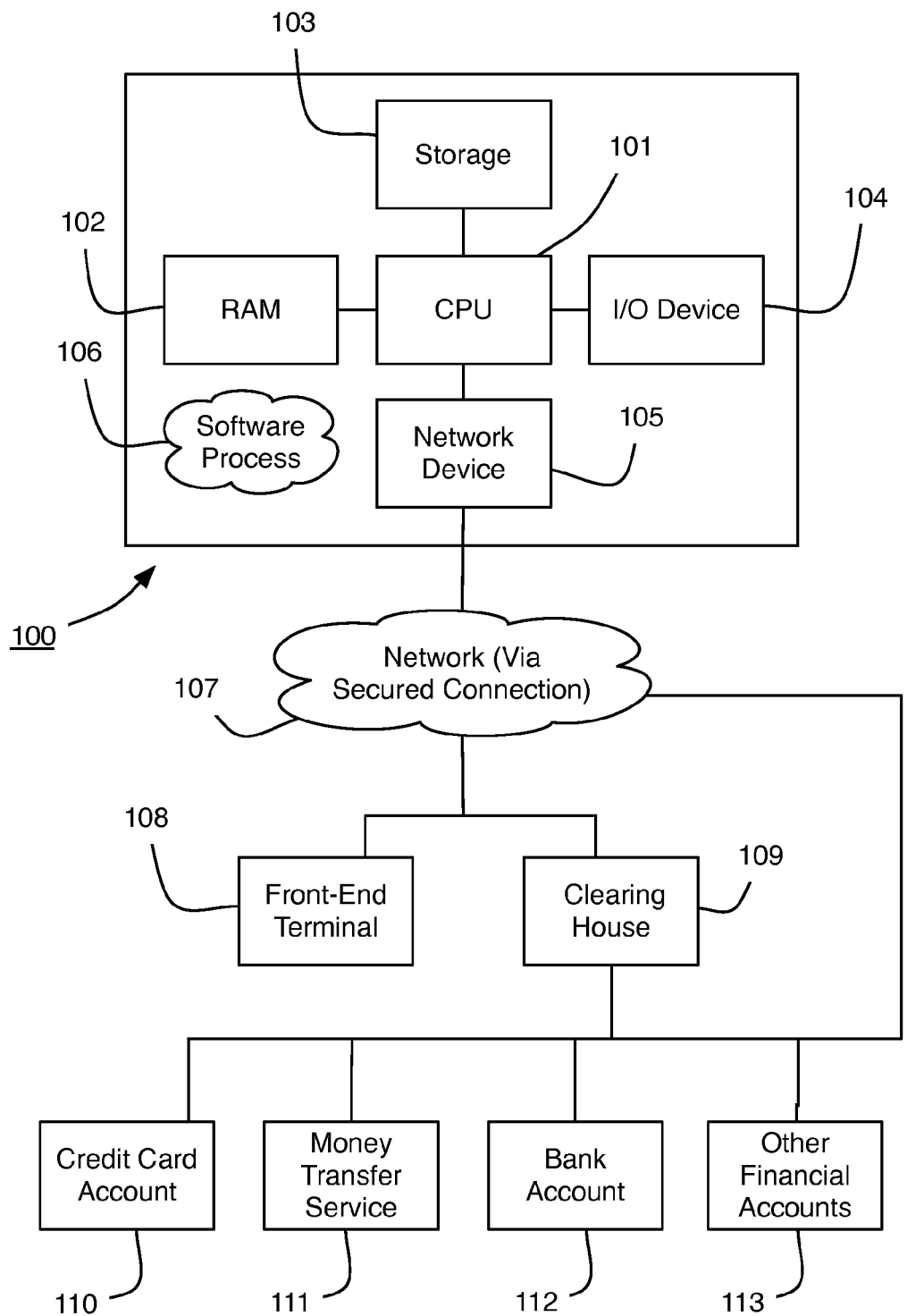
FIG. 1 is a high-level system diagram representation of a preferred multi-account payment consolidation system and process.

FIG. 1 is a high-level system diagram representation of an illustrative multi-account payment consolidation system and process. The multi-account payment consolidation system and process may be implemented on a computer system 100 with a software process 106. If computer system 100 comprises multiple computers, then software process 106 may be operating on some or all of the individual computer systems in tandem (presumably to service a large number of transactions from consumers). Preferably, multi-account payment consolidation software process 106 includes one or more software applications (possibly including a database or having access to a database) designed to interact with a front-end website hosted on computer system 100 and accessible through network 107 from a remote terminal, not unlike the common credit, banking and other financial services offered online by many major financial corporations.

Generally, computer system 100 preferably has at least one central processing unit (CPU) 101 for executing calculations. CPU 101 may comprise a single or multi-core type processor. Random access memory (RAM) 102 may be provided as fast-access memory for CPU 101. Storage device 103 may be provided as permanent storage, such as hard disk, tape or any other suitable storage medium. Input/output (I/O) device 104 may be provided for human interaction, and may include devices such as keyboard, mouse, computer display and hardware adapter, tablet, touch-screen, etc. Network device 105 may provide network access for computer system 100. Network device 105 may be implemented as any desirable network device, including ethernet, fiber optic, cable, wireless, etc. Similarly, network 107 may represent any type of network, including intranet and extranet. Preferably, network 107 may represent the global Internet. Due to the sensitive financial nature of the information involved with the multi-account payment consolidation system and process, the connection between network device 105 and the network 107 is preferably a secured, authenticated connection. Computer system 100, software process 106 and other related components may be equipped to pass any number of known authentication protocols if desired.

Front-end terminal 108 is preferably provided so consumers can interact with the multi-account payment consolidation system and process at a point-of-sale, and may be utilized to access the computer system 100 through the network connection 107. Front-end terminals 108 are preferably installed at point-of-sale locations, such as a retail register, a gasoline fuel dispenser or a vending machine. Mobile terminals and supporting software application packages 108 are also contemplated, such as a portable device carried by a waiter at a restaurant, or a mobile payment device carried by a salesperson, possibly negating the need for a paper check or bill. In one embodiment, a user's mobile phone may be utilized as a mobile terminal, with the user completing the transaction on a mobile phone application, the results of which may be forwarded to a receiving terminal, such as one installed in a restaurant, pay-on-site service, or even another phone. Front-end terminal 108 preferably has a screen and interface for interacting with consumers. A touch-screen interface may be preferable, although other methods may be contemplated as well. The screen may display a graphical user interface (GUI) that allows a consumer to access a plurality of inputs and menus, all directed to present the consumer with their financial account information and enable payment for goods and services. Additionally, other information related to the consumer's financial accounts may be displayed, such as coupon offers, point-reward systems, and any other information display that may be advantageously implemented. Such secondary information displays may, for example, aid consumers in maximizing tangential benefits, such as strategically selecting payment methods to maximize bonus point or cash-back offers on their external accounts.

Front-end terminal 108 is preferably equipped with hardware based network authentication devices that enable a secure connection to computer system 100. For example, the front-end terminal 108 may include an authentication token generating key at fixed intervals, comporting with the requirements for implementing a (for example) RSA™ compliant authentication system.

Front-end terminal 108 may also include a card reader that reads information off a magnetic strip, allowing it to read information off credit cards, debit cards and other cards related to external financial accounts. Alternatively, it may be equipped with a plurality of magnetic strip readers. That would allow the issuance of a single card (tied to the system and process) having a plurality of magnetic strips, each magnetic strip tied to a different external account, thereby consolidating the number of cards a consumer would typically carry. In yet another embodiment, an issuer may issue a single card that is registered with the multi-account payment consolidation system and process. The single card may be associated electronically (for example, in a database in or operatively connected to computer system 100) with the consumer's external financial accounts. Swiping the single card may then automatically enable the consumer to draw from those external financial accounts. Alternatives may be utilized in place of card-readers and magnetic strip cards. For example, universal serial bus (USB) memory sticks, proprietary key fobs (such as RSA-based security tokens) and other such personal data devices may be utilized as desired. Consumers would benefit because they would no longer need to carry all of the cards associated with their various external financial accounts. A variety of security and verification techniques may be applied as appropriate. For example, a challenge authentication may be implemented, where use of a credit card considered less secure automatically triggers a challenge question sent to a user's registered phone or other device. Subsequently, an appropriate response via voice, text or other secure application may be required to properly authenticate the user. A photo-capture system may be utilized, similar to the ones in use at automated teller machines, to capture the image of the consumer at the transaction. If fraudulent activity is later detected, the image corresponding to the illicit transaction may be retrieved to aid the authorities in apprehending the thief.

Clearing house 109 may represent one or more financial transaction processors that provide clearing and settlement services. These may include entities such as, for example, acquirers and automated clearing houses. Clearing house 109 preferably has authorization to credit and debit the consumer's external financial accounts to enable payment for goods or services. To do so, it preferably has electronic access to external financial accounts (and the related computer systems supporting each external account (including, for example, third-party identify verification), represented here as external credit card account 110, money transfer service 111, bank account 112 and other financial accounts 113. Because clearing house 109 may (at least partially) represent many institutions that are already extant, the multi-account payment consolidation system and process may not require significant creation of new information infrastructure for implementation.

When front-end terminal 108 makes a request for information, this request is preferably received by computer system 100 through network 107, which may then access that information directly from external financial accounts 110-113. This may add an additional layer of security on information requests for sensitive financial information. For example, a consumer who wishes to see an account balance on a credit card may access that information through the user-interface on front-end terminal 108. Two layers of security may be utilized here. The consumer may be asked to authenticate himself to log in to the front-end terminal 108. Therefore, a security layer is present within the multi-account payment consolidation system and process. Once authenticated, the front-end terminal 108 then sends that information request to the computer system 100 (which may serve as an intermediary here to provide better security for information transactions) through network 107. A second layer of security is preferably present here, as the consumer had to authenticate the addition of the external account to the multi-account payment consolidation system and process earlier during the initial registration process. Computer system 100 may then query a credit card account system 110 (for example, a Bank of America® credit card account server) for the relevant information, and send that information through network 107 to front-end terminal 108 for display.

Similarly, when a consumer has finalized a payment method on computer system 100 (through front-end interface 108), computer system 100 preferably sends individual payment instructions to the one or more clearing houses 109. Computer system 100 may need to generate and send separate payment instructions to different clearing houses 109, as different types of payments may utilize different information infrastructure. For example, credit and debit cards utilize an acquirer as an intermediary between the credit/debit account institutions, while a money wire may come directly from an issuing institution.

Figure 2:
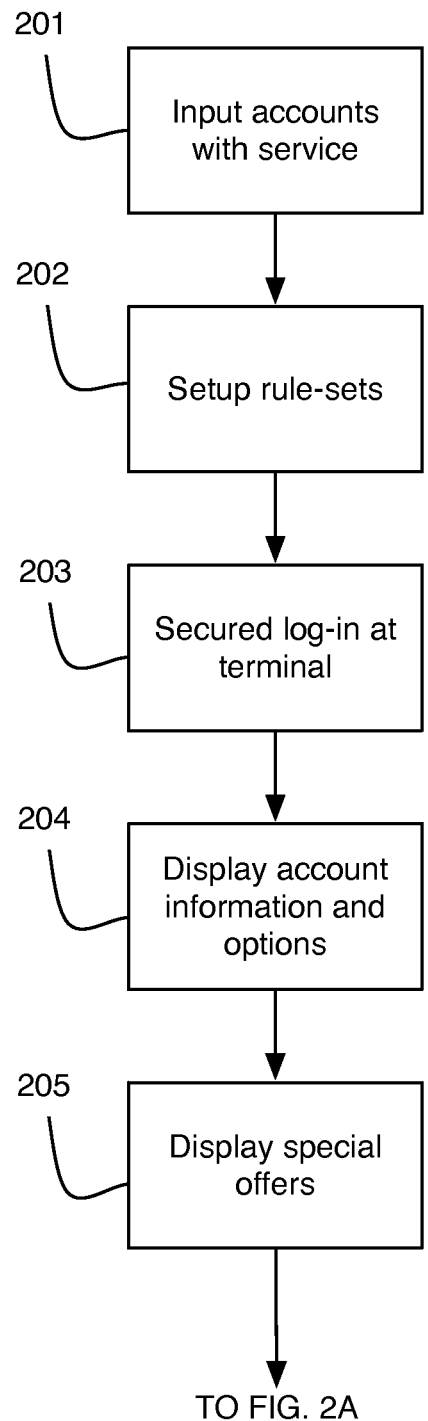
FIG. 2 is a flow chart diagram illustrating a preferred sequence of steps that may be used to implement the multi-account payment consolidation system and process.

FIG. 2 is a flow chart diagram illustrating a preferred sequence of steps that may be used to implement the multi-account payment consolidation system and process. Once registered to use the multi-account payment consolidation service, in step 201, a consumer may input his financial accounts with computer system 100. Preferably, the consumer logs on to the computer system 100 remotely through the network 107, via a remote terminal (e.g., a personal computer at home, for instance) utilizing a web-based user interface (similar to accessing online banking and online credit card accounts). The consumer may log on to the website using a username and password combination, possibly supplemented by security questions (the answers to which may be selected during the initial registration process). As typical, the computer system 100 may monitor the activity of the consumer while logged on to the website and automatically employ additional verification/authentication challenges if the consumer shows long periods of inactivity or delays in completing transactions at a point-of-sale. This may safeguard against malicious use of the consumer's account in the event that the consumer has left the remote terminal and negligently left himself logged in by accident, or access by an unauthorized user possessing, for example, only a part of the security information required to complete a transaction. Because of the sensitive nature of the information being transmitted, the connection through network 107 is preferably secured and/or authenticated under any of the popular and powerful authentication protocols commonly used on the Internet.

Once logged into the system, the consumer may link other financial accounts to the multi-account payment consolidation system and process account. Preferably, the web-based graphical user interface (GUI) has options that allow the consumer to enter relevant account information, including security checks and access information. The multi-account payment consolidation system and process may require additional verification during the process of associating the external accounts 110-113 with the multi-account payment consolidation service. For example, a double authentication procedure may be utilized to confirm that the external account being registered actually belongs to the consumer who is attempting to register it with the service.

In one exemplary authentication method (presently utilized by, for example, PayPal®), computer system 100 may formulate a deposit of some known quantity of money into the external account. The consumer must then access the external account via a separate method, note the amount of money deposited by the multi-account payment consolidation service, and then report that amount back to the multi-account payment consolidation service to confirm that the consumer has proper access to the external account. It is understood that this procedure is merely exemplary, and that other authentication procedures may naturally be implemented as desired.

Once completed, the computer system 100 then preferably contacts each external account server 110-113 to confirm access based on the information the consumer has inputted. The user may need to take extra steps on the external account side in order to give the multi-account payment consolidation service permission to draw from the external accounts 110-113, depending on the security measures in place at each external account. For example, direct conversation with an account representative for the external financial account may be required to establish the connection between the multi-account payment consolidation system and process and the external financial accounts 110-113.

Once the consumer has completed registration of the external accounts with the multi-account payment consolidation system and process, then, in step 202, the consumer may set up one or more preferred payment schemes to be utilized at a point-of-sale. A preferred payment scheme may be any rule-set or predetermined plan that draws payment from one or more combination of external accounts in some logical order predetermined by the user. For example, a consumer may opt to draw a first credit card down to its limit before moving on to a second credit card. Alternatively, a consumer may set an order to the rule-set such that the card with the highest coupon or bonus point rewards obtained is drawn to its limit first, thereby maximizing the rewards obtained for each period. Any such rule-set may be implemented according to the consumer's needs. In other words, the rule-sets are preferably flexible enough to allow the consumer to create the precise methodology with which the external accounts should be accessed.

For example, in one alternative embodiment, a user may implement a rule-set that executes balance swaps between different accounts to take advantage of preferential interest rates and special interest-rate offers. The cumulative effect of these actions may be to effect additional payments during the billing cycle to help lower the marginal interest rate on a collective principal balance, similar to a methodology often employed to reduce mortgage interest with smaller payments on a bi-weekly payment schedule.

Contingency rules may be implemented as well. For example, a consumer may instruct the system to seek payment from a debit/bank account if all credit card accounts are drawn to their maximum. If the debit account is in danger of being overdrawn, the consumer may specify for an alert notification to be sent to the consumer's cell phone via text message (for example). Security protocols may also be implemented. For example, a consumer may set a "fake" personal identification code for use with the system at a point-of-sale front-end terminal 108, which triggers an alert and may (for example) generate a false balance, or alert the police. Therefore, if the "fake" personal identification code is entered, the multi-account payment consolidation system and process may place a security alert on the account and notify building security, police or some other kind of emergency service. This would allow a consumer in duress to notify authorities without exposing himself as having done so to a coercing party. Other contingency actions are contemplated. For example, the entering of a "fake" personal identification code may cause a "fake" access-denial to be displayed at the point-of-sale, send a signal to a participating merchant's in-house security personnel, trigger activation of a camera system to capture video at that particular register or terminal, or deploy any other available means to ensure the safety of the cardholder.

Another type of rule-set may permit utilization of an external financial account that is normally not accepted at a particular retailer. For example, if a retailer only accepts Citibank® credit cards, but not American Express™ credit cards, a typical consumer would be forced to use a Citibank® card. However, a consumer utilizing the multi-account payment consolidation system and process may create a rule-set that automatically draws matching funds from the American Express® and applies them towards the Citibank® account every time he uses his Citibank® credit card. Therefore, a consumer would be able to constructively utilize his American Express® credit card account where it would normally be impossible. This may be highly beneficial to smaller store specific credit cards (such as Macy's®, Sears®, etc.) that currently have limited application, but typically offer large incentives for their use. Other such rule-sets, protocols and contingencies may be implemented if desired.

In step 203, the consumer may utilize front-end terminal 108 to initiate a payment. The consumer is preferably presented with a front-end terminal 108 during the payment process. This may be brought to the consumer (if front-end terminal 108 is a mobile terminal), or the consumer may be required to move to a terminal 108 mounted in a fixed location (e.g., affixed near the cashier near the end of a check-out aisle in the supermarket). The front-end terminal 108 preferably displays a graphical user interface (GUI) for easy access to its functions.

The consumer may log on to the multi-account payment consolidation system and process using the graphical user interface. Logging on may be accomplished, for example, via a dedicated multi-account payment consolidation system and process security card in combination with extra security information. For example, registered question and answer queries, user ID, alphanumeric passwords, pin-numbers passwords, secondary challenge questions, device authentication (e.g., a specialized text message with a password sent to the consumer's cell phone), and other common methods may be used alone or in combination. Other types of authentication may be used. For example, biometric authentication may be utilized, such as fingerprint, retina scanning or facial recognition. Other solutions are contemplated as well, such as RSA cryptography smart cards and/or radio frequency identification.

Once the appropriate inputs have been received, front-end terminal 108 preferably sends the verification information to computer system 100, which may perform a computerized comparison of the inputs against known valid quantities stored during the registration process. If the verification information matches the known verification information, the consumer may be logged onto the system. Alternative authenticating techniques may be utilized as required or desired. For example, a fingerprint reader may be attached to front-end terminal 108 to authenticate the consumer via a fingerprint.

Once the consumer has been authenticated, then, in step 204, a graphical user interface may display user account information and present the consumer with a variety of options. Options may include checking the balance on each external account, selecting a predefined rule-set or payment scheme for the current transaction, setting up a new payment rule-set or scheme, etc. Alternatively, the balance on each external financial account may be displayed automatically. Implementation of real-time external financial account status updating may be dependent upon a number of factors, including the number of accounts the consumer has, the server load on the external financial account computer servers, network latency, etc. Additional real-world considerations may also apply. For example, a bank account may have been updated in real-time for display to the consumer, but there may be pending un-cleared checks that may cause the real-time account balance to be misleading as a result.

When the consumer requests information that is not currently displayed or known, front-end terminal 108 preferably sends an appropriate command or information request to computer system 100 through network 107. Computer system 100 may either retrieve the information from its own database (if it has the information), or contact external account servers 110-113 to query the information if required. Once computer system 100 has the requested information, it preferably sends the information through network 107 back to front-end terminal 108, where it is then displayed to the consumer.

When the consumer indicates he is ready to begin the payment process, a special offer screen may be displayed in step 205. The special offer screen preferably displays special offers the consumer may add to his purchase. For example, if the consumer is purchasing an electronics device, the special offer screen may give the consumer the option to add a warranty for the device to his purchase. Other types of offers may be suggested for purchase as well. Special promotions, discounts, sale items or promotions related to the consumer's external accounts, and other such advertising material may all be displayed during this time. For example, if a consumer has a number of reward points applicable to the current purchase, he may be notified of this by prompt and be presented with the option to spend those reward points towards the current purchase.

In one alternative embodiment, the system may employ a feature that allows users to track and manage the reward points associated with the relevant user accounts. The optional feature may include a point-swapping system allowing users to obtain some needed quantity of reward points for a first account by trading away a higher amount of points from a second account.

Warranties and other special offers may also be stored in computer system 100. This would relieve consumers from the burden of keeping documents related to purchases, such as warranties, as they would now be stored electronically in a central location and retrievable at any retail store utilizing a front-end terminal 108. This may be extended to other types of purchased-related documents as well. For example, non-sensitive medical documentation, such as insurance information and prescriptions may be generated and stored electronically. A consumer could thereby walk into a pharmacy, download a prescription from a front-end terminal 108 and have the prescription filled based on the information contained therein. Similarly, a consumer could walk into a doctor's office, and, with a single card swipe at a front-end terminal 108 import all relevant history and medical documentation, as the swipe automatically triggers transference of the relevant history and medical documentation to the medical provider's record keeping system, thereby eliminating the lengthy and burdensome process of, for example, filling out a brand new set of forms each time a new provider is selected by the consumer.

Figure 2A:
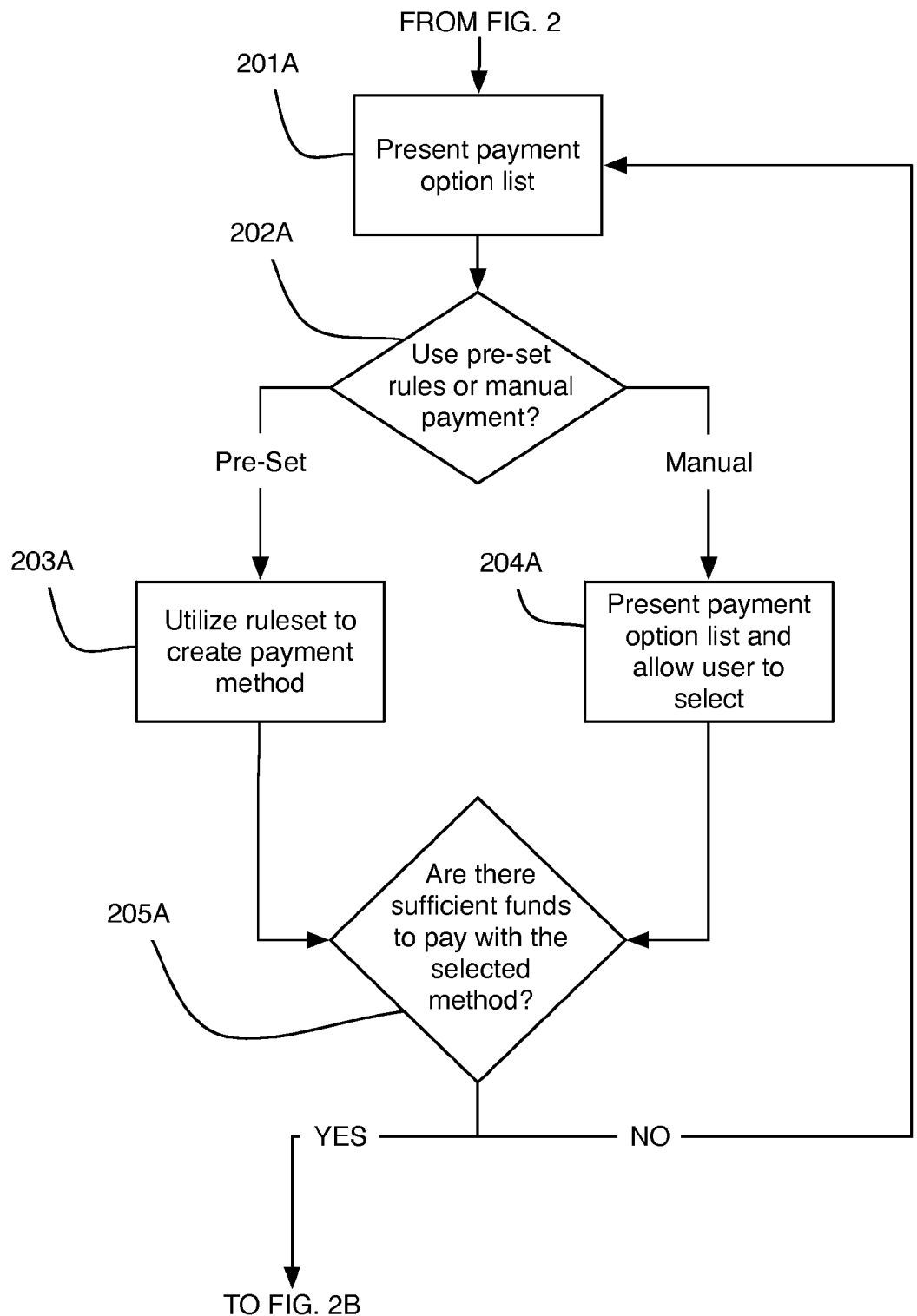
FIG. 2A is a continuing flow chart diagram illustrating a preferred continued sequence of steps that may be used to implement the multi-account payment consolidation system and process.

FIG. 2A is a continuing flow chart diagram illustrating a preferred continued sequence of steps that may be used to implement the multi-account payment consolidation system and process. In step 201A, the front-end terminal 108 may display a graphical user interface screen wherein the consumer can select a payment option. The consumer may then determine whether he wishes to utilize a pre-set rule scheme (as prepared in step 202), or instead conduct the transaction manually (e.g., create a payment scheme at that time).

If the consumer elects to use a pre-set rule scheme, then, in step 203A, the front-end terminal 108 preferably transmits this preference to computer system 100 through network 107 for processing.

Alternatively, if the consumer elects a manual payment scheme, then in step 204A, the consumer preferably utilizes the graphical user interface to configure the payment scheme and finalize it. The consumer may, for example, wish that the bill be divided in a specific way between a plurality of external financial accounts. The graphical user interface is preferably equipped to allow a consumer to configure the manual payment scheme in any manner he wishes. Information may be provided to the consumer to aid in that decision. For example, interest rate information on each account may be presented to the user, so that the consumer may decide how to split the payment among multiple accounts based on the interest rate of each account and select the most favorable provider (or providers) at such time. Once the payment scheme has been entered, the front-end terminal 108 then preferably transmits this new scheme to computer system 100 through network 108 for processing. Participating locations may deploy "pre-checkout" management stations where a consumer may privately apply changes to rule-sets associated with their account, rather than attempting to apply changes to rule-sets while on line. This may speed the checkout process and relieve any pressure on the consumer to make a quick decision.

In step 205A, the multi-account payment consolidation system and process preferably receives the payment instructions and may subsequently determine whether there are sufficient available funds to perfect the transaction based on the desired payment scheme. If computer system 100 does not possess updated information regarding the involved external financial accounts, an information request may be sent from computer system 100 through network 107 to the relevant account servers 110-113 to obtain balance and limit information for each external account. The balance for each card may be subtracted from the limit information to determine an available funds limit for each account. If the current charge is less than the available funds limit, then the card may be considered serviceable for the transaction under the current scheme. If the current charge is greater than the available funds limit, then the card may not be considered serviceable for the transaction under the current scheme absent addition verification from the consumer.

For example, if a consumer has elected to pay a bill with a Citibank® account and a Bank of America® account, computer system 100 preferably queries Citibank® and Bank of America® credit card servers (represented here abstract as credit card servers 110) and obtains balance and credit limit information for each card. After computing the available funds limit for each card, the multi-account payment consolidation system and process may determine whether the payment scheme is serviceable based on the amount to be charged to each card.

A combination of manual and automatic payment schemes may also be utilized. For example, a consumer may set a rule that if an elected payment method will overdraw the account from which payment is desired, the system may automatically charge the balance of the payment to a back-up external account. Therefore, a consumer may manually select a Citibank® card from which to draw the payment. If the Citibank® card is in danger of going over the credit limit, the multi account payment consolidation system and process may automatically defer to the automatic rule-set and charge the balance to the back-up external account.

If the multi-account payment consolidation system and process determines the payment scheme is not serviceable (in step 205A), then it may return to step 201A to allow the consumer to select a new payment scheme. Emergency payment options may be presented to the consumer at this time, in the event that none of the consumer's financial accounts can service transaction, alone or in combination. The consumer, for instance, may opt to obtain a short-term loan from an institution related to one or more of his financial accounts. This institution may be a traditional bank or credit card issuer. Alternatively, it could come from non-traditional sources. For example, the consumer may request a short term cash loan from a cell phone provider, to be repaid on his next cell phone bill, similar to the way certain major cellular provides provide cash advances on cell phone equipment purchases. The corporation managing the multi-account payment consolidation system and process itself may also serve as the lender of last resort, profiting from an interest fee or convenience fee.

Figure 2B:
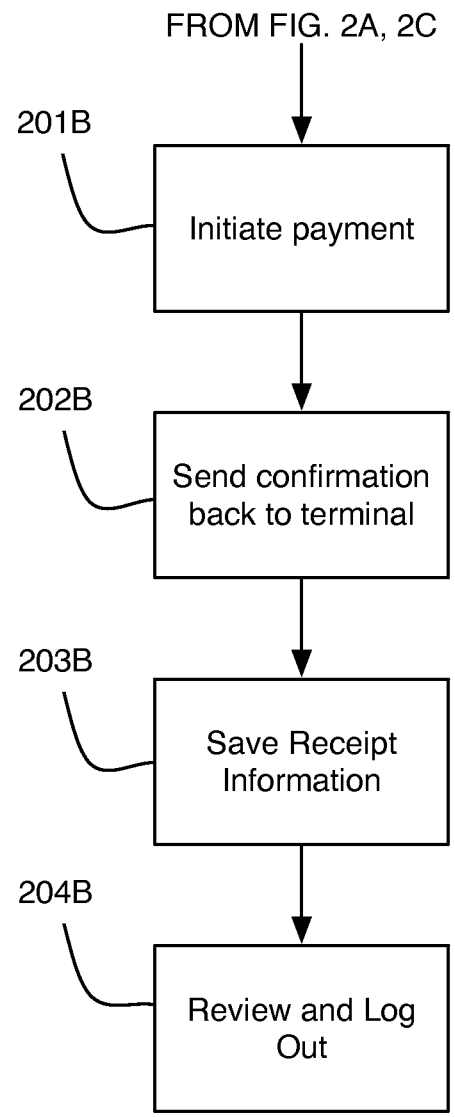
FIG. 2B is a continuing flow chart diagram illustrating a preferred continued sequence of steps that may be used to implement the multi-account payment consolidation system and process.

If the multi-account payment consolidation system and process determines the payment scheme is serviceable (in step 205A), then it may proceed to FIG. 2B, step 201B, where it initiates payment with each individual account.

FIG. 2B is a continuing flow chart diagrams illustrating a preferred continued sequence of steps that may be used to implement the multi-account payment consolidation system and process. In step 201B, computer system 100 preferably sends an appropriate payment request through network 107 to the appropriate external account servers 110-113. For example, if the consumer requests a total bill to be split evenly between a credit card account, a bank/debit card account and a money transfer service, computer system 100 preferably sends three separate payment instructions, one to the relevant credit card account 110, one to the money transfer service 111 and one to bank account 112. In turn, computer system 100 preferably receives a payment confirmation from each external account server 110-113 to which it has sent a payment instruction.

In step 202B, the payment confirmation may be transmitted back to front-end terminal 108 for display to the consumer. The payment confirmation preferably includes at least a summary of the accounts to which money has been charged and the amount of each charge. Other information may also be presented, such as remaining available funds on each account, outstanding balance, etc.

In step 203B, the consumer may be presented with the option to save receipt information from the transaction. The receipt information, if elected to be stored, may be saved (for example) on hard drive 103 of computer system 100, and permanently associated with the consumer's account on computer system 100. In this way, the multi-account payment consolidation system and process may doubly serve as a database of receipts and transactions for the consumer. If the consumer later wishes to return the item, then instead of producing a paper receipt, the consumer may use front-end terminal 108 at the store to electronically retrieve the purchase receipt as proof of purchase for a return.

In step 204B, the consumer may review the information and log out of the system. Front-end terminal 108 may send a logout request to computer system 100 indicating that the current consumer has logged out. Computer system 100 preferably ignores subsequent requests for that particular consumer account, thereby ensuring that illegitimate consumers will not gain access to the consumer's account absent a new login process with the appropriate authentication information.

There are other advantageous aspects of the multi-account payment consolidation system and process. The multi-account payment consolidation system and process may improve overall heuristic-based security and pattern-based tracking of consumer spending patterns for the purposes of fraud protection. Typically, card issuers will issue a preliminary fraud alert if they detect spending patterns that are abnormal. For example, if a consumer does most of his retail purchases in New York, but recently purchased an expensive item in Britain, a card issuer is likely to implement a temporary fraud alert, freeze the card account and alert the consumer of the discrepancy.

The problem here is that purchase information for a single consumer is segregated among any number of external financial accounts, with no way for any single card issuer to access the purchase information from the consumer's other external financial accounts. Therefore, this kind of pattern-based tracking and monitoring can be improved by the multi-account payment consolidation system and process because it aggregates all purchase information into a central location. The Britain purchase may have been less suspicious if it was known that the consumer recently purchased an airplane ticket to Britain. In turn, that would only be possible if a centralized system included purchase information from all of the consumer's external financial accounts. Currently, consumers are often the victims of their own card issuers' zealous (but justified) efforts to protect their financial security, and are, as a result, left financially stranded when a temporary fraud alert is issued until they can contact their financial institution and confirm that the purchases are legitimate. Therefore, the multi-account payment consolidation system and process may improve fraud alert and detection for consumers by reducing the number of false fraud alerts.

Another extension of the multi-account payment consolidation system and process is preferably the ability to issue checks. Typically, checks are drawn from a single financial account. Similar to the problem with retail transactions recited above, it is also problematic to pool funds from a plurality of external financial accounts and have them combined into a single check. Such a transaction would typically have to be coordinated manually, and is therefore inconvenient. Because the multi-account payment consolidation system and process has the ability to access and draw funds from multiple external financial accounts to process payments, it can also be adapted to draw funds from a plurality of external financial accounts to issue a check to the consumer. As with retail transactions, this vastly improves the financial utility of possessing multiple external financial accounts for consumers.

Many consumers may have the credit necessary to make certain payments. However, the vendor or merchant may not accept credit cards, or participate in the multi-account payment consolidation system. Because the multi-account payment consolidation system draws down available credit, the drawn funds are immediately available and considered to be "good funds." This is highly similar to the use of a bank check, money order, or cashier's check to pay for an item. Therefore, participating locations (preferably retail chains, such as 7-Eleven®) may provide check-issuing services whereby a consumer may use their available credit to issue a check comparable to a money order or certified check. This method allows the check receiver to possess good funds immediately after the check is deposited. In particular, for rent payments, service contracts (that do not accept credit cards), utility bills, and other similar payments may be paid for by drawing on any available credit to support such a payment (for a nominal fee). The entity issuing the check may employ a secondary level of security by physically checking a consumer's photo identification before delivering the check to the consumer.

Another extension of the multi-account payment consolidation system and process is preferably the ability to create a secondary account under the control of the primary account used by the consumer. The consumer may have the ability to set usage and access restrictions on the secondary account with the application of rule-sets. For example, the consumer may create a rule-set that limits the secondary account to purchasing school related material only. Thereafter, the consumer may give his college-bound child access to the secondary account. When the college-bound child attempts to purchase any item, the multi-account payment consolidation system and process may automatically detect the type of item being purchased and determine whether it is eligible for purchase based on the rule-set the consumer has created. The consumer is preferably able to set up any type of restriction on the secondary account as desired, including limitations on spending, access to external financial accounts, price limits on single items, item types, restrictions on time (i.e., the hours in which the secondary account may be used), etc.

Another extension of the multi-account payment consolidation system and process is the ability to store typical purchase lists (e.g., a grocery list) within the multi-account payment consolidation system and process. The multi-account payment consolidation system and process may thereby integrate with retail database inventories (such as those that support retailer's online web stores) and present the consumer with comparison views between retailers competing for the cheapest options to purchase the items on the list. Coupons, sales and other special offers may be automatically sent to, for example, a consumer's registered e-mail address.

Another extension of the multi-account payment consolidation system and process is preferably the ability to present the consumer with coupon deals applicable to a particular retail store or a set of items. The front-end terminal 108 may be adapted to print (by including an attached printer) a coupon printout for the consumer to peruse while shopping. Alternatively (or in conjunction with this aspect), front-end terminal 108 may also be adapted to automatically apply coupons to the consumer's items while the consumer is finalizing his purchase (as many grocery market stores already do). The coupons considered may be both coupons offered by the retail store, and manufacturer coupons offered by item manufacturers. The system may be adapted to charge manufacturers for presenting coupons to the consumer. Additionally, coupons may be set to display when competing items are scanned into front-end terminal 108 for checkout purposes. For example, a coupon for a Pepsi® item may be displayed when a consumer scans a Coke® item. Manufacturers may be charged fees for these advertising services.

The multi-account payment consolidation system may also include a dispute system component. Because of the large number of accounts that may be tied to a single purchase, consumers who detect problems with one particular transaction may need to contact multiple external financial account providers. This would overburden both the consumer and the external financial account provider. To alleviate this problem, a centralized dispute resolution system may be implemented as part of the multi-account payment consolidation system. This component may be tasked with seamlessly centralizing typical dispute resolution functions, such as credit card charge-backs, charging disputes, etc.

The multi-account payment consolidation system may also be implemented for use at home. Front-end terminals 108 may be sold as standalone devices for use in homes, or, alternatively, the system may be implemented as a software process operating on a home personal computer. The system may therefore be adapted to benefit the consumer who shops at home, enabling payment to online retailers, catalog-enabled phone and television shopping networks, etc. Security may be included in these home-use systems. For example, panic codes (as described above) may be utilized to discretely notify authorities of a situation or trigger additional safeguards. Alternatively, verification may include a phone call to the user's home phone number, or a text message to the user's cell phone. If the phone call is not answered, or the text message is not replied to, authorities may be summoned to the resident automatically. Other such methods may be implemented as desired.

The multi-account payment consolidation system may record a variety of data on user habits, including items purchased, favorite retailer locations (both physically and online), payment methods, etc. This data may be aggregated and sold to a variety of parties, including external financial account providers and retailers, for example. Third parties may use this data in a variety of ways, such as increasing security for account holders, or improving directed advertising to increase ad-driven revenue flow.

The CPU 101 processes and executes computer program instructions. Random access memory (RAM) and/or fast access cache memory 102 preferably provides fast data supply to CPU. Long-term storage 103 may be provided as a more permanent form of computer memory, and may be, for example, a hard disk, optical disk, flash memory, solid-state memory, tape, or any other type of memory.

The I/O device(s) 104 permit human interaction with the computer system, such as (but not limited to) a mouse, keyboard and computer display. I/O device(s) 104 may also include other interactive devices, such as (but not limited to) touch screens, digital stylus, voice input/output, etc.

The network interface device 105 may provide the computing system with access to a network 107, which may be a secured wireless or wired connection. The network 107 may be, for example, the Internet, a corporate intranet, or any other computer network through which computing system may connect to or otherwise communicate with other computers and databases. External financial account systems 110-113 and the other databases represent other computerized systems or databases for specialized information that may be necessary for implementation of the multi-account payment consolidation system and process operating on computer system 100.

Software process or processes and executables (such as process 106) on the computing system may be used to provide human interfaces (such as a graphical user interface), and to store and initiate computer program instructions used to process and analyze data. Computer program code for carrying out operations described herein may be written in any combination of one or more programming languages, including an object oriented programming language such as Java, C++, C# or the like and conventional procedural programming languages, such as the "C" programming language or similar programming languages. The program code may execute entirely on the computing system 100, partly on the computing system 100, as a stand-alone software package, partly on the computing system 100 and partly on a remote computer or server, or entirely on a remote computer or server.

This application was described above with reference to flow chart illustrations and/or block diagrams of methods, apparatus (systems) and computer program products according to one or more embodiments. It is understood that some or all of the blocks of the flow chart illustrations and/or block diagrams, and combinations of blocks in the flow chart illustrations and/or block diagrams, can be implemented by computer program instructions. The computer program instructions may also be loaded onto the computing system 100 to cause a series of operational steps to be performed on the computer to produce a computer implemented process such that the instructions that execute on the computer provide processes for implementing the functions/acts specified in the flowchart and/or block diagram block(s). These computer program instructions may be provided to the CPU 101 of the computing system 100 such that the instructions, which execute via the CPU 101 of the computing system 100, create means for implementing the functions/acts specified in the flowchart and/or block diagram block(s).

These computer program instructions may also be stored in a computer-readable medium that can direct the computing system 100 to function in a particular manner, such that the instructions stored in the computer-readable medium implement the function/act specified in the flowchart and/or block diagram block or blocks. Any combination of one or more computer usable or computer readable medium(s) may be utilized. The computer-usable or computer-readable medium may be, for example (but not limited to), an electronic, magnetic, optical, electromagnetic, infrared, or semiconductor system, apparatus, device, or propagation medium. More specific examples (a non-exhaustive list) of the computer-readable medium include the following: an electrical connection having one or more wires, a portable computer diskette, a hard disk, a random access memory, a read-only memory, an erasable programmable read-only memory (e.g., EPROM or Flash memory), an optical fiber, a portable compact disc read-only memory, an optical storage device, a transmission media such as those supporting the Internet or an intranet, or a magnetic storage device. Any medium suitable for electronically capturing, compiling, interpreting, or otherwise processing in a suitable manner, if necessary, and storing into computer memory may be used. In the context of this disclosure, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in base band or as part of a carrier wave. The computer usable program code may be transmitted using any appropriate medium, including (but not limited to) wireless, wire line, optical fiber cable, RF, etc.

Having described and illustrated the principles of this application by reference to one or more preferred embodiments, it should be apparent that the preferred embodiment(s) may be modified in arrangement and detail without departing from the principles disclosed herein and that it is intended that the application be construed as including all such modifications and variations insofar as they come within the spirit and scope of the subject matter disclosed herein.

What is claimed is:

1. A multi-account payment consolidation system, comprising:
   a payment terminal at a point-of-sale to initiate a payment of a single transaction; and
   a central computer system, operatively coupled to the payment terminal through a network connection, wherein the central computer system including at least:
   a processor; and
   memory comprising program instructions, wherein the program instructions are executable by the processor to:
      register a plurality of external financial accounts and associate them with a user;
      register at least one user-defined customized rule-set to process a payment associated with the user;
      authenticate the user when the user logs in at the payment terminal;
      automatically process the payment in accordance with the customized rule-set by accessing the external financial accounts, wherein the customized rule-set directs at least a rule that the payment of the single transaction be apportioned between more than one of the external financial accounts in accordance with the user-defined customized rule-set; and
      receive a payment confirmation from the external financial accounts to display to the user on the payment terminal.

2. The system of claim 1, wherein the payment terminal is a mobile terminal and the network connection is wireless.

3. The system of claim 1, wherein the payment terminal is a fixed terminal.

4. The system of claim 1, wherein the registration of the plurality of external financial accounts and the association of them with the user requires an additional external authentication process.

5. The system of claim 1, wherein authentication of the user requires the use of a unique access card.

6. The system of claim 1, wherein the user is issued a card having a plurality of magnetic strips, each magnetic strip correlating to a different one of the plurality of external financial accounts.

7. The system of claim 1, wherein authentication of the user further comprises depositing an undisclosed quantity of assets into the external financial account, requiring the user to log in to the external financial account to discover the quantity, and having the user report the quantity to complete authentication for that external financial account.

8. The system of claim 1, wherein the customized rule-set comprises a contingency plan to draw funds from a secondary financial account if a primary financial account is in danger of being overdrawn.

9. The system of claim 1, wherein the customized rule-set directs that each external account should be used continuously until drawn down to its limit before switching to another external financial account.

10. The system of claim 1, wherein the customized rule-set utilizes external financial accounts in such a way as to maximize secondary benefits associated with the external financial accounts.

11. The system of claim 10, wherein the secondary benefits include cash-back bonuses.

12. The system of claim 10, wherein the secondary benefits include point-based benefits.

13. The system of claim 1, wherein the program instructions further comprise issuing a discrete alert notification to the user if an external financial account used in a present transaction is in danger of being overdrawn.

14. The system of claim 13, wherein the discrete alert notification is a message sent to the user's cell phone.

15. The system of claim 1, wherein the program instructions further comprise allowing the user to select an alternate payment method if at least one external financial account used in a present transaction is in danger of being overdrawn.

16. The system of claim 15, wherein the alternate payment method comprises obtaining a short-term loan for at least a portion of the present transaction when the at least one external financial account used in a present transaction is in danger of being overdrawn.

17. The system of claim 16, wherein the short-term loan is obtained from a cellular phone provider.

18. The system of claim 1, wherein the program instructions further comprise offering the user the option to purchase a warranty related to the present transaction.

19. The system of claim 18, wherein the program instructions further comprise storing the warranty information in the central computer system when the user opts to purchase the warranty and retrieving the warranty information when it is requested.

20. The system of claim 1, wherein the program instructions further comprise storing receipt information related to the transaction, and retrieving the receipt information when it is requested.

21. The system of claim 1, wherein the customized rule-set comprises substituting a non-accepted external financial account with an accepted external financial account by utilizing the accepted external financial account to make the payment and crediting the accepted external financial account with funds from the non-accepted external financial account when a retailer associated with the payment accepts the accepted external financial account but not the non-accepted external financial account.

22. The system of claim 1, wherein the program instructions further comprise storing a historical record of all past user purchases across all external financial accounts and utilizing the historical record to detect possible fraudulent purchases that do not correlate with past purchase behavior.

23. The system of claim 1, wherein the program instructions further comprise issuing a single check with funds drawn from a plurality of external financial accounts according to user demand.

24. The system of claim 1, wherein the program instructions further comprise issuing a secondary account for a secondary user, wherein the user may implement at least one rule-set placing restrictions on usage of the secondary account.

25. The system of claim 1, wherein the program instructions further comprise storing a purchase list including a number of purchase items for the user, and correlating the purchase items with pricing information obtained from retailers to determine a best price for each purchase item for display to the user.

26. The system of claim 25, wherein the best price for each purchase item includes consideration of special price promotions from at least a manufacturer of the purchase item and a retailer for the item.

27. The system of claim 1, wherein the program instructions further comprise storing coupon information from an affiliated retailer and presenting the coupon information to the user when the user requests the coupon information at the terminal.

28. A computer-implemented method of implementing multi-account payment consolidation, the method comprising:
providing a payment terminal at a point of sale to initiate a payment of a single transaction;
providing a central computer system, operatively coupled to the terminal through a network connection, wherein the central computer system including a processor and memory comprising program instructions, wherein the program instructions are executable by the processor to:
register a plurality of external financial accounts and associate them with a user;
register at least one user-defined customized rule-set to process a payment associated with the user;
authenticate the user when the user logs in at the payment terminal;
automatically process the payment in accordance with the customized rule-set by accessing the external financial accounts, wherein the customized rule-set directs at least that the payment of the single transaction be apportioned between more than one of the external financial accounts in accordance with the user-defined customized rule-set; and
receive a payment confirmation from the external financial accounts to display to the user on the payment terminal.

29. The method of claim 28, wherein the payment terminal is a mobile terminal and the network connection is wireless.

30. The method of claim 28, wherein the payment terminal is a fixed terminal.

31. The method of claim 28, wherein the registration of the plurality of external financial accounts and the association of them with the user requires an additional external authentication process.

32. The method of claim 28, wherein authentication of the user requires the use of a unique access card.

33. The system of claim 28, wherein the user is issued a card having a plurality of magnetic strips, each magnetic strip correlating to a different one of the plurality of external financial accounts.

34. The method of claim 28, wherein authentication of the user further comprises depositing an undisclosed quantity of assets into the external financial account, requiring the user the log in to the external financial account to discover the quantity, and having the user report the quantity to complete authentication for that external financial account.

35. The method of claim 28, wherein the customized rule-set comprises a contingency plan to draw funds from a secondary financial account if a primary financial account is in danger of being overdrawn.

36. The method of claim 28, wherein the customized rule-set directs that each external account should be used continuously until drawn down to its limit before switching to another external financial account.

37. The method of claim 28, wherein the customized rule-set utilizes external financial accounts in such a way as to maximize secondary benefits associated with the external financial accounts.

38. The method of claim 37, wherein the secondary benefits include cash-back bonuses.

39. The method of claim 37, wherein the secondary benefits include point-based benefits.

40. The method of claim 28, wherein the program instructions further comprise issuing a discrete alert notification to the user if an external financial account used in a present transaction is in danger of being overdrawn.

41. The method of claim 40, wherein the discrete alert notification is a message sent to the user's cell phone.

42. The method of claim 28, wherein the program instructions further comprise allowing the user to select an alternate payment method if at least one external financial account used in a present transaction is in danger of being overdrawn.

43. The method of claim 42, wherein the alternate payment method comprises obtaining a short-term loan for at least a portion of the present transaction when the at least one external financial account used in a present transaction is in danger of being overdrawn.

44. The method of claim 43, wherein the short-term loan is obtained from a cellular phone provider.

45. The method of claim 28, wherein the program instructions further comprise offering the user the option to purchase a warranty related to the present transaction.

46. The method of claim 45, wherein the program instructions further comprise storing the warranty information in the central computer system when the user opts to purchase the warranty and retrieving the warranty information when it is requested.

47. The method of claim 28, wherein the program instructions further comprise storing receipt information related to the transaction, and retrieving the receipt information when it is requested.

48. The method of claim 28, wherein the customized rule-set comprises substituting a non-accepted external financial account with an accepted external financial account by utilizing the accepted external financial account to make the payment and crediting the accepted external financial account with funds from the non-accepted external financial account when a retailer associated with the payment accepts the accepted external financial account but not the non-accepted external financial account.

49. The method of claim 28, wherein the program instructions further comprise storing a historical record of all past user purchases across all external financial accounts and utilizing the historical record to detect possible fraudulent purchases that do not correlate with past purchase behavior.

50. The method of claim 28, wherein the program instructions further comprise issuing a single check with funds drawn from a plurality of external financial accounts according to user demand.

51. The method of claim 28, wherein the program instructions further comprise issuing a secondary account for a secondary user, wherein the user may implement at least one rule-set placing restrictions on usage of the secondary account.

52. The method of claim 28, wherein the program instructions further comprise storing a purchase list including a number of purchase items for the user, and correlating the purchase items with pricing information obtained from retailers to determine a best price for each purchase item for display to the user.

53. The method of claim 52, wherein the best price for each purchase item includes consideration of special price promotions from at least a manufacturer of the purchase item and a retailer for the item.

54. The method of claim 28, wherein the program instructions further comprise storing coupon information from an affiliated retailer and presenting the coupon information to the user when the user requests the coupon information at the terminal.

* * * * *